Dec. 11, 1962  W. E. CAWLEY  3,068,161
METHOD AND APPARATUS FOR CONTROL OF A NUCLEAR REACTOR
Filed June 5, 1961  2 Sheets-Sheet 1
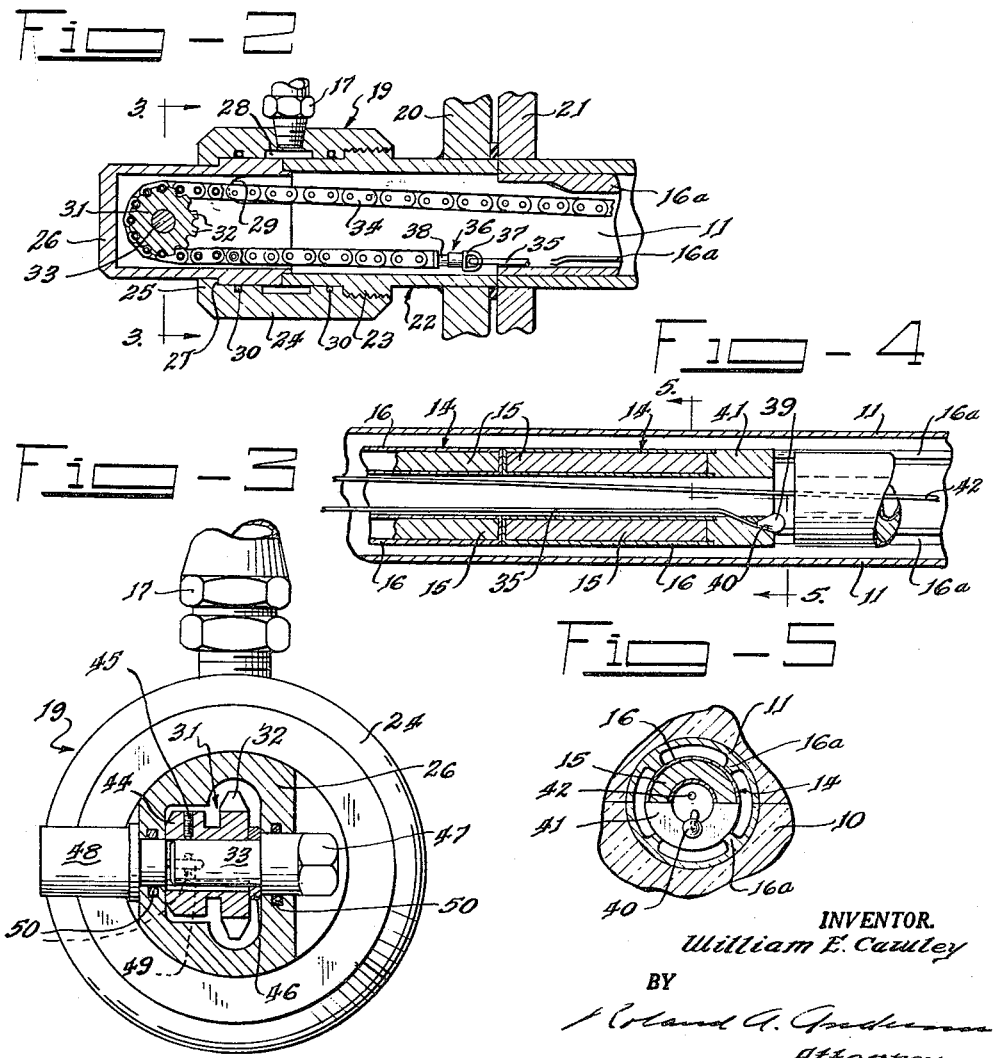
INVENTOR.
William E. Cawley
BY
Roland A. Anderson
Attorney

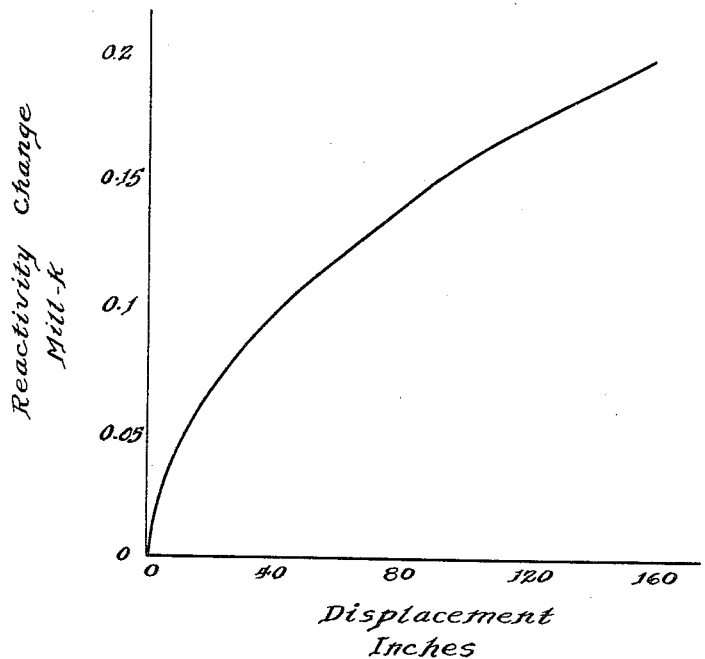

3,068,161
Patented Dec. 11, 1962

3,068,161
METHOD AND APPARATUS FOR CONTROL OF A NUCLEAR REACTOR
William E. Cawley, Richland, Wash., assignor to the United States of America as represented by the United States Atomic Energy Commission
Filed June 5, 1961, Ser. No. 115,050
2 Claims. (Cl. 204—154.2)

The present invention relates to a method and apparatus for controlling a nuclear reactor and more particularly to a method of controlling a nuclear reactor during startup after a period of shutdown. The invention applies specifically to natural-uranium-fueled, graphite-moderated, water-cooled nuclear reactors which contain greater than the optimum proportion of moderator to fuel. Such reactors are called over-moderated reactors herein. Reactors of this general type are disclosed in Patent No. 2,910,418, issued October 27, 1959, to E. C. Creutz et al. Fermi et al. Patent No. 2,708,656 discusses in columns 27 to 31 the effect of varying the relative proportion of moderator and fuel in a nuclear reactor.

As is well known, the amount of $Xe^{135}$ in a reactor builds up to a peak after the reactor is shut down and then drops off so that approximately 99% of the $Xe^{135}$ has decayed within 72 hours. When a reactor is started up before the $Xe^{135}$ has substantially disappeared, a period of rapid reactivity gain—known as the startup reactivity transient—results as residual xenon poison is destroyed by absorption of neutrons. This follows because $Xe^{136}$ has a thermal neutron absorption cross section many orders of magnitude less than that of $Xe^{135}$ and, at the moment the chain reaction is reinitiated, the reactor contains relatively small quantities of $I^{135}$ to decay to additional $Xe^{135}$. The reactivity gain continues until the buildup rate of $Xe^{135}$ exceeds its rate of decay and destruction by absorption of neutrons. The excess reactivity then drops to an equilibrium value. In a graphite-moderated reactor the startup reactivity transient is enhanced by the increase in temperature of the graphite moderator.

This reactivity surge of a reactor following startup after a period of shutdown creates a problem in control of the reactor. Many reactors are operated with safety controls and regulating controls, and it may be necessary in restarting a nuclear reactor of this type to employ more control than the regulating control elements provide. Several methods of providing this supplemental control have been suggested such as the use of poison columns and poison splines. These methods all give the supplemental control desired but all suffer from one or more disadvantages.

It is accordingly an object of the present invention to develop a novel method and apparatus for controlling a nuclear reactor.

It is a further object of the invention to develop a method of starting up a nuclear reactor after a period of shutdown.

These and other objects of the invention are attained in accordance with my invention by removing fuel from the center of the reactor and replacing it with water. As applied to a reactor consisting of a plurality of parallel coolant tubes through which water flows and which contain a plurality of aligned, abutting fuel elements, the objects of the invention are attained by providing means for splitting the column of fuel elements in one or more tubes at the center of the column and moving the two halves of the column apart. The space vacated by fuel is filled with water which acts as a poison since the reactor is over-moderated. The reactivity of the reactor is thus decreased by separating the halves of the fuel element column and increased by bringing them together again.

The invention will next be described referring to the accompanying drawing.

In the drawing:
FIG. 1 is a diagrammatic view of a portion of a nuclear reactor,
FIG. 2 is an enlarged cross-sectional view of that portion of FIG. 1 included in brackets 2,
FIG. 3 is a cross-sectional view looking in the direction of the arrows 3—3 in FIG. 2,
FIG. 4 is an enlarged cross-sectional view of that portion of FIG. 1 included in brackets 4,
FIG. 5 is a cross-sectional view looking in the direction of arrows 5—5 in FIG. 4,
FIG. 6 is a graph illustrating the amount of control obtained from the present invention in a typical reactor.

Referring now to FIG. 1 of the drawing, this figure shows a portion of a nuclear reactor which includes a mass 10 of graphite as moderator, a plurality of coolant tubes 11 extending through the moderator and through front and rear shields 12 and 13 respectively, and fuel elements 14 disposed in the coolant tubes 11. Fuel elements 14 are short cylindrical tubular bodies 15 (see FIG. 4) of a material fissionable by thermal neutrons such as natural uranium which are covered by a protective jacket 16. They rest on ribs 16a which extend inwardly from the walls of coolant tubes 11 as shown in FIG. 5. In accordance with the present invention, the column of fuel elements 14 may be split at the center and the two halves moved apart. In the upper coolant tube 11, shown in FIG. 1, the halves of the column of fuel elements 14 are shown in their position of maximum reactivity, whereas in the lower coolant tube 11 they are shown in the position of minimum reactivity. An inlet line 17 and an outlet line 18 respectively for coolant water are also shown.

Referring now more particularly to FIG. 2, coolant tube inlet caps 19 are fastened to coolant tubes 11 by bolts (not shown) passing through flanges 20 and 21. Inlet caps 19 consist of a tubular section 22 having an enlarged threaded portion 23 at the end, a retainer collar 24 threadedly engaging the said enlarged portion 23 and having an inwardly extending lip 25 at the other end thereof, and a sprocket housing 26 having a shoulder 27 which is engaged by lip 25 of collar 24. Water inlet 17 penetrates collar 24 and communicates with an annular passage 28 on the inside of collar 24. A slot 29 in housing 26 permits water to flow from annular passage 28 into coolant tubes 11. O-rings 30 seal the inlet against loss of water.

A sprocket 31 formed with teeth 32 and having a sprocket shaft 33 extending therethrough is disposed in sprocket housing 26. A sprocket chain 34 engages the sprocket 31. A first cable 35 is connected to one end of sprocket chain 34 by means of a connector 36 consisting of a shoulder nut 37 and a cap screw 38. As shown in FIGS. 2 and 4, cable 35 extends through the center of tubular fuel elements 14 and terminates in a ball 39 which engages a recess 40 in a special end cap 41 on a central fuel element 14.

A second cable 42 is connected to the other end of sprocket chain 34 and also extends through the center of tubular fuel elements 14 to connect with the most remote fuel element 14 from the sprocket 31.

Referring now to FIG. 3, sprocket 31 is provided with a shoulder 44 through which a set screw 45 extends. A spacer element 46 is provided to ensure clearance between the sprocket teeth 32 and the body of sprocket housing 26. Sprocket shaft 33 terminates in head 47 at one end thereof and engages an odometer 48 at the other end thereof by means of a drive shaft 49. O-rings 50 prevent leakage of coolant water through the housing 26.

In normal operation of the reactor, all fuel elements 14 are abutting. Water is passed through coolant tubes 11 and flows over the outside and through the inside of fuel elements 14.

To decrease reactivity of the reactor a wrench is applied to head 47 of shaft 33 and turned in a clockwise direction. Cable 35 thereby draws one-half of the fuel elements toward the sprocket 31. The other half of the fuel elements are freed from restraint by cable 42 and are forced away from sprocket 31 by the flow of coolant water passing through coolant tube 11. The space at the center of the reactor which had been occupied by fuel will now be filled with water which absorbs neutrons and serves as a poison since the reactor is overmoderated. Odometer 48 indicates the amount of separation of the fuel elements. Conversely, rotation of sprocket shaft 33 in the opposite direction pulls one-half of the fuel elements 14 in toward the center of the reactor and relaxes restraint on the other one-half of the fuel elements which are forced to the center of the reactor by the flow of water through the tube. By this means reactivity is increased. It will be appreciated that a major advantage of the present invention is that poison is introduced into the center of the reactor where it will absorb the most neutrons, without distorting the flux front-to-rear as is inherent in the spline and poison column systems previously referred to.

Although manual control only is illustrated, it will be at once apparent that a motor can also be employed to adjust the position of the fuel elements.

It is clear that there is no tendency for the column to move except when force is applied to the shaft 33 because the forces on the halves of the fuel element column due to the water flow are balanced.

This equipment can be used for fine control of the reactivity of the reactor at any time needed. It may be used to flatten the flux in the reactor by separating the half-columns of fuel elements near the center of the reactor where the flux is the highest and bringing them closer together away from the center of the reactor.

The most important use of the equipment described is in startup of the reactor while $Xe^{135}$ is present in the reactor. The control is used in addition to conventional regulating rod control. On startup of the reactor before all of the $Xe^{135}$ has disappeared, the reactivity starts increasing due to the startup reactivity transient. As reactivity builds up, the two halves of the columns of fuel elements are separated by turning shaft 33 just enough to hold the excess reactivity down to the point where the regulating rods can maintain control. After the peak of the startup transient is reached and the excess reactivity goes down, the shaft 33 is turned in the opposite direction to bring the fuel elements in toward the center of the reactor thereby compensating for the loss of excess reactivity. The device can be applied to any number of tubes desired and the amount of control necessary will determine the number of fuel element columns separated. In a typical reactor the invention may be applied to 50 to 100 tubes to obtain adequate control.

FIG. 6 illustrates the reactivity change attained when the invention is applied to a typical coolant tube of a typical reactor of the type shown in the above-mentioned Creutz et al. patent. It is based on observation of an actual installation of the invention. In the graph 0″ displacement represents the condition when the two halves of the column are together and 160″ displacement equals the condition with the column halves each moved 80″ away from the center.

It will be understood that the invention is not to be limited to the details given herein but that it may be modified within the scope of the appended claims.

What is claimed is:

1. A method of controlling the startup transient in an overmoderated, water-cooled nuclear reactor containing columns of fuel elements aligned in a plurality of coolant tubes wherein water passes through the coolant tubes comprising moving the front half of the column of fuel elements upstream and moving the rear half of the column of fuel elements downstream to separate the halves of the fuel element column during the transient increase in reactivity caused by xenon burnout and moving the halves of the fuel element column together as reactivity decreases because of xenon buildup.

2. Apparatus for controlling an overmoderated nuclear reactor which contains rows of tubular fuel elements slidably disposed in parallel, horizontal tubes and wherein water is flowed through the tubes past the fuel elements comprising a sprocket in the upstream end of at least one tube, a sprocket chain engaging said sprocket, a first cable passing through the fuel elements and attached to the farthest downstream fuel element, a second cable passing through the fuel elements and attached to a fuel element near the middle of the reactor, and means for rotating the sprocket to separate or bring together halves of the column of fuel elements.

References Cited in the file of this patent
UNITED STATES PATENTS

| | | |
|---|---|---|
| 2,806,819 | Christy et al. | Sept. 17, 1957 |
| 2,910,418 | Creutz et al. | Oct. 27, 1959 |